M. TILLIE.
MACHINE FOR MAKING BUTTONHOLES IN COLLARS, CUFFS, &c.
APPLICATION FILED APR. 30, 1909.
947,605.
Patented Jan. 25, 1910.
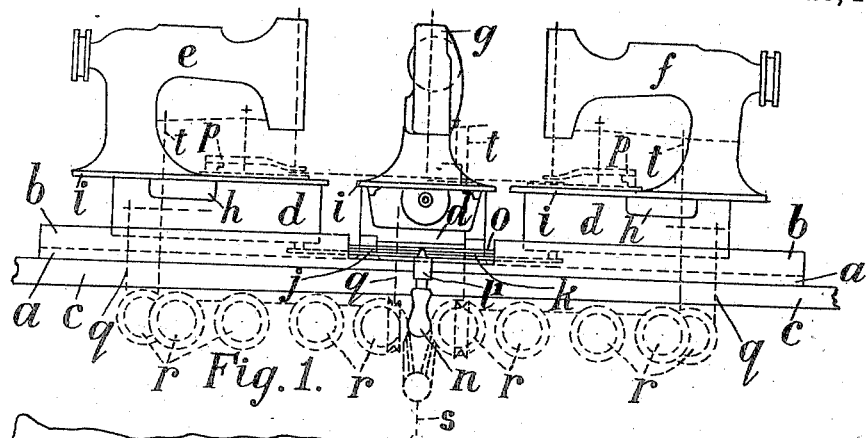
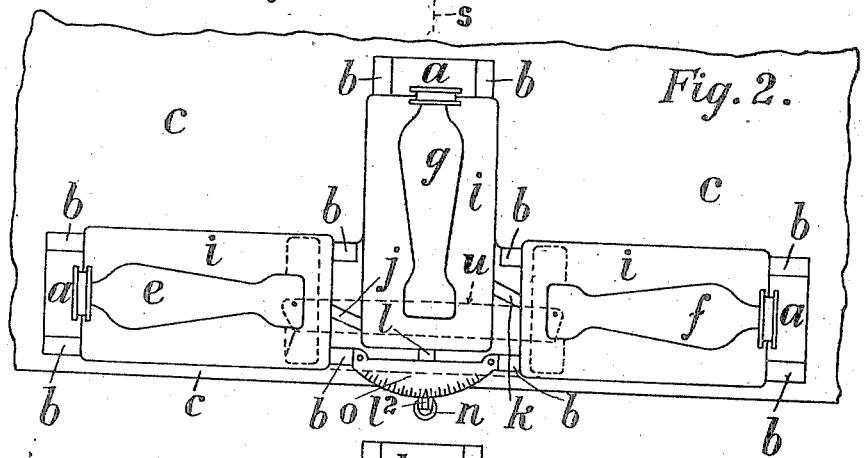
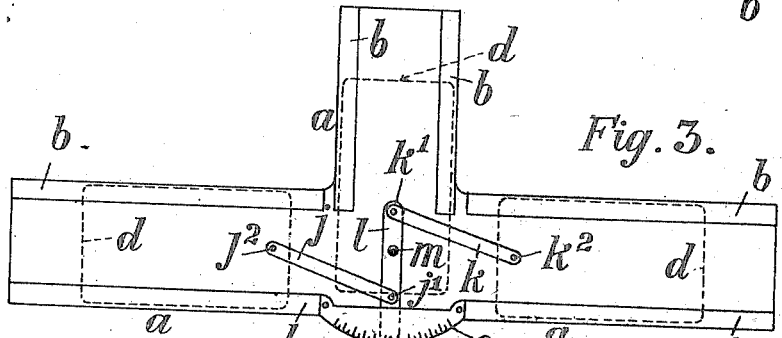
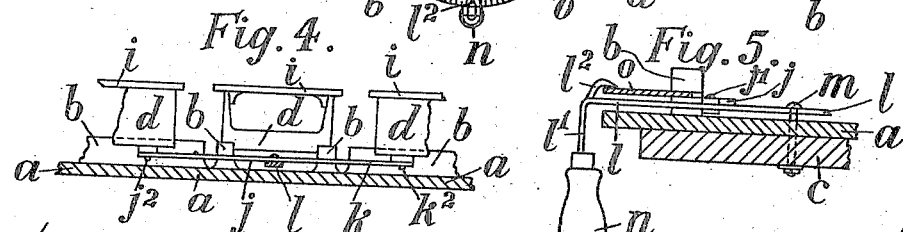
Witnesses:
Inventor
Marshall Tillie.
By Wiedersheim & Fairbanks
Attorneys.

UNITED STATES PATENT OFFICE.

MARSHALL TILLIE, OF LONDONDERRY, IRELAND.

MACHINE FOR MAKING BUTTONHOLES IN COLLARS, CUFFS, &c.

947,605. Specification of Letters Patent. Patented Jan. 25, 1910.

Application filed April 30, 1909. Serial No. 493,128.

*To all whom it may concern:*

Be it known that I, MARSHALL TILLIE, a subject of the King of Great Britain, residing at Londonderry, Ireland, have invented certain new and useful Improvements in Machines for Making Buttonholes in Collars, Cuffs, Shirt-Neckbands, and the Like, of which the following is a specification.

This invention relates to improvements in machines for making buttonholes in collars, cuffs, shirt neckbands, shirt fronts and the like.

By means of this invention the separate operation of marking by hand the position of the buttonholes is obviated while, in place of forming each buttonhole separately, as has been hitherto customary, a number of buttonholes are made at one operation thereby effecting considerable saving in time and labor; and, moreover, any size of collar, or the like, can be operated on.

In order that my said invention may be properly understood I have hereunto appended an explanatory sheet of drawings, whereon:—

Figure 1 is a front view of the invention fitted in connection with three buttonhole forming and sewing mechanisms of machines which may be of any well known type. Fig. 2 is a plan view of the same. Fig. 3 is a plan view of the framework with the machine removed. Fig. 4 is a sectional front view showing the levers $j$, $k$, $l$. Fig. 5 is a detail view to an enlarged scale, of the lever $j$ and the lever $l$ with its operating handle $n$.

In carrying out my invention I provide a suitable framework $a$ of tee shape, as shown clearly at Fig. 3, which may or may not be made all in one piece and which has upwardly projecting guides $b$ formed thereon. This framework can be secured to the usual work bench $c$ or to any other convenient support.

Fitted in connection with the framework $a$ and arranged so as to readily slide on the guides $b$ are three rectangularly shaped hollow supports $d$ on which the bed plates $i$ of the buttonhole forming and sewing mechanisms or machines $e$, $f$, $g$, rest, the machine $g$, as shown, being at right angles to the machines $e$, $f$. The supports $d$ may be made with openings $h$, where required, to allow of the free movement of the mechanism of the machines. The two end machines $e$, $f$, are so arranged that they can be readily adjusted longitudinally so as to adapt them to any size of collar, cuff, shirt neckband, or the like, while the central machine $g$, which is for forming the usual back buttonhole in a collar or the like, may be fixed or not as desired.

To permit of the end machines $e$, $f$, being readily moved apart or brought closer together in accordance with the size of the article being operated on an arrangement of levers or their equivalent $j$, $k$, $l$, is provided. The lever $l$ is pivoted to the framework $a$ at $m$ and is bent downward at its outer end $l^1$ and provided with an operating handle $n$. One end of the lever $j$ is connected at $j^1$ to the lever $l$ and at the other end to the bottom of the left hand support $d$ at $j^2$, while the other lever $k$ is connected at $k^1$ to the lever $l$ and at the other end to the bottom of the right hand support $d$ at $k^2$. By moving the lever $l$ the right and left hand supports $d$ and the sewing machines $e$, $f$, can be brought toward each other or moved farther apart in accordance with the size of the collar or the like being operated on.

In order to enable the operator to accurately adjust the machines $e$, $f$, to any desired distance apart *i. e.* to the size of the collar or other article being operated on, a cover plate $o$ is suitably secured to the framework $a$ at the front thereof a short distance above the lever $l$ and is provided with a measuring scale divided into inches and parts of inches. An index finger $l^2$ is fitted to the lever $l$ and works in conjunction with the measuring scale so that by operating the lever $l$ by means of the handle $n$ the machines can be easily adjusted to the required number of inches.

The machine $g$ needs very little adjustment but when it is required to move it slightly backward or forward this can be easily done by the operator sliding its supports $d$ along the guides $b$.

Each of the end machines $e$, $f$, is, when making buttonholes in collars, fitted with the guide or attachment (indicated in dotted lines at $p$) which forms the subject matter of my prior application for patent Serial No. 454226 dated 22nd Sept. 1908, by means of which the collar being operated on can be readily placed in proper position on the machines for the bottonhole forming operation. Each machine is actuated in the ordinary manner, from a suitable source of power, and is provided with the well known "Singer" or other start and stop mechanism which forms no part of the present invention, but in order to operate the three machines simultaneously, the usual operating chains, cords or the like, *q*, *t*, of each machine are carried over guide pulleys *r* or such like a central chain, cord or the like *s* connected with the usual well known foot mechanism so that by one movement thereof all the machines can be simultaneously set in motion or stopped as required.

With the present invention the buttonholes in cuffs, shirt neckbands and the like can also be formed though for purposes of illustration I have indicated in dotted lines at Fig. 2 a collar *u* being operated on.

Having now fully described my invention what I claim and desire to secure by Letters Patent is:—

1. In combination, three buttonhole sewing mechanisms two of them placed in line and the third intermediate of and at an angle to the other two, a support for said mechanisms and means for simultaneously adjusting the two mechanisms which are in line the third mechanism being capable of independent adjustment by hand.

2. In combination, three buttonhole sewing mechanisms two of them placed in line and the third intermediate of and at an angle to the other two, a tee-shaped support for said mechanisms and means for operating the three mechanisms simultaneously.

3. In combination, three buttonhole sewing mechanisms two of them placed in line and the third intermediate of and at an angle to the other two, a support for said mechanisms having upwardly projecting guides and rectangularly shaped hollow supports mounted on the guides for each of the sewing mechanisms.

4. In combination, three buttonhole sewing mechanisms two of them placed in line and the third intermediate of and at an angle to the other two, a tee shaped framework, upwardly projecting guides on the framework and three rectangularly shaped hollow supports mounted on the said guides one for each mechanism.

5. In combination, three buttonhole sewing mechanisms two of them placed in line and the third intermediate of and at an angle to the other two, a tee shaped framework, upwardly projecting guides on the framework and three rectangularly shaped hollow supports mounted on the said guides one for each mechanism and means for simultaneously adjusting two of the supports.

6. In combination, three button hole sewing mechanisms, a tee shaped framework for the same, upwardly projecting guides on the framework, three rectangularly shaped hollow supports mounted on the said guides, manually operated lever mechanism connected to the framework and to two of the supports and means for longitudinally adjusting the positions of these supports relative to each other.

7. In combination, three button hole sewing mechanisms, a tee shaped framework for the same, upwardly projecting guides on the framework, three rectangularly shaped hollow supports mounted on the said guides, manually operated lever mechanism connected to the framework and to two of the supports for longitudinally adjusting the positions of these supports relative to each other and a measuring scale arranged in conjunction with said lever mechanism whereby the buttonhole and sewing mechanisms can be accurately set to the size of the article to be operated on.

In testimony whereof I affix my signature in presence of two witnesses.

MARSHALL TILLIE.

Witnesses:
PHILIP O'HAGAN,
JOHN J. BOWLER.